April 14, 1931.　　　M. ZAIGER ET AL　　　1,800,273
SPLASH GUARD FOR AUTOMOBILE FENDERS
Filed July 13, 1929
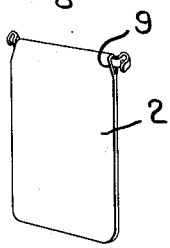
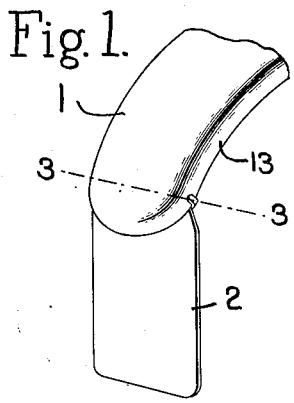
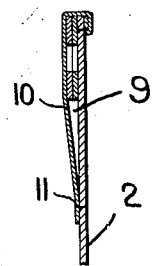
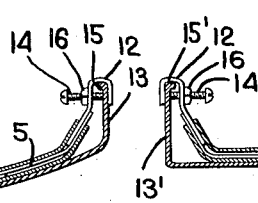
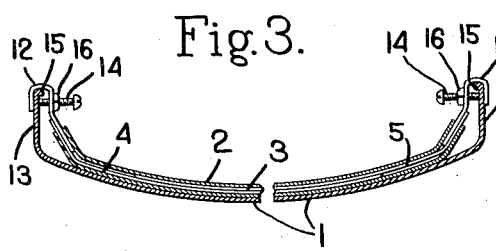
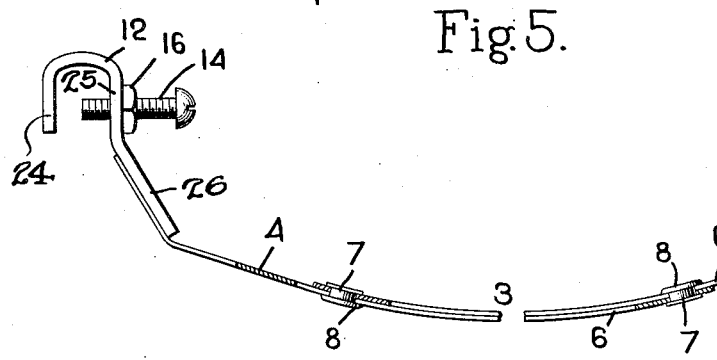
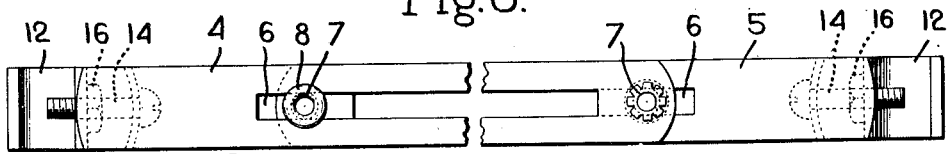
Inventors.
Max Zaiger
Louis Zaiger
by Heard Smith & Tennant
Attys.

Patented Apr. 14, 1931

1,800,273

UNITED STATES PATENT OFFICE

MAX ZAIGER AND LOUIS ZAIGER, OF LYNN, MASSACHUSETTS

SPLASH GUARD FOR AUTOMOBILE FENDERS

Application filed July 13, 1929. Serial No. 378,006.

This invention relates to a splash guard to be applied to the rear fender of an automobile and especially to the means for attaching the guard to the fender. The principal object of the invention is to provide a splash guard with improved holding or clamping means that is constructed so that it will readily fit any fender. The holder is extensible so that it can be adjusted to fenders of different widths and the body thereof is flexible so that it will easily conform to the contour of the fender.

In order to give an understanding of the invention we have illustrated in the drawings a selected embodiment thereof which will now be described after which the novel features will be pointed out in the appended claims.

Fig. 1 is a view illustrating a rear fender of an automobile with an improved splash guard secured thereto;

Fig. 2 is a perspective view of the splash guard and holder therefor;

Fig. 3 is an enlarged section taken on the line 3—3, Fig. 1;

Fig. 4 is a view similar to Fig. 3 but showing the guard as applied to a fender having a different contour from that shown in Fig. 3;

Fig. 5 is a view of the holder for the splash guard with parts broken out;

Fig. 6 is a side view of Fig. 5;

Fig. 7 is a vertical sectional view through the splash guard and its supporting means.

In the drawings 1 indicates the rear end of the rear fender of an automobile and 2 is the splash guard which is secured thereto. This splash guard may be made of rubber or coated fabric or any other material which is commonly used in the making of splash guards.

The splash guard is secured to the fender through the medium of a holder device indicated generally at 3. This holder device is made extensible in the direction of its length so that it can be adjusted to fit fenders of different widths and the body thereof is also made flexible so that it will conform to the contour of the fenders. Suitable means are provided for clamping the holder device to the fender.

The holder is made with the two sections 4 and 5 of flexible strap material which are connected together to slide one on the other. Each section is shown as provided with a slot 6 and each is also formed with a headed projection 7 operating in the slot of the other section. This headed projection can be provided for in various ways without departing from the invention. As herein shown it is in the form of a tubular stud which is anchored in the end of one section and which projects through the slot of the other section, the stud being headed over as usual as shown at 8 and the head engaging the face of the other section. A holder made in this way can be easily extended or collapsed and because of the flexible nature of the sections 4 and 5 it can be easily bent into different shapes.

The splash guard 2 is suspended from the holder 3 and for this purpose said splash guard is shown as provided at its upper end with a loop 9 through which the holder 3 extends. This loop 9 may be formed by folding the upper edge of the splash guard back on itself and sewing the folded portion to the body of the loop or may be made by attaching a flap 10 to the upper edge of the splash guard and then folding the flap back against the body of the guard and sewing it thereto by stitches 11.

The holder 3 may be clamped to the fender in various ways. One method is shown in Figs. 3, 4 and 5 and according to this each of the sections 4 and 5 of the holder 3 is provided at its end with a rigid hook member 12 which is adapted to embrace the flange 13 of the fender 1. This hook member carries a clamping screw 14 which screws through the body thereof and is adapted to engage the inner side of the flange 13, preferably behind the bead 15 of the flange. 16 is a lock nut which is screw threaded to the clamping screw 14 by which said screw may be locked in its operative position. The two sides 24, 25 of each hook member 12 are shown as substantially parallel to each other and each hook member is also shown as provided with a rigid stem portion 26 which extends at an angle from the inner side 5. The ends of the sections 4 and 5 are rigidly secured to the stems 26 in any approved way. The device as thus described can be used equally well with a crowned fender, such as shown in Fig. 3, or a flat-faced fender such as shown in Fig. 4. In either case the holder member is adjusted as to its length so that the hooks 12 can embrace the flanges of the fender (13 in Fig. 3 or 13' in Fig. 4), and when the screws 14 are tightened to clamp the outer legs 24 of the hook members against the outer face of the fender the hooks will assume the position shown in Figs. 3, 4 and 5. When the hooks 12 are thus clamped to the flanges of the fenders the inclined or nonparallel position which the rigid stems 26 of the hook portions assume have a tendency to bow the flexible body member outwardly so that it assumes a more or less curved shape as shown best in Fig. 5. If the fender 1 is a crowned fender then this bowing tendency will cause the flexible body portion to lie closely against and to conform to the under face of the fender as shown best in Fig. 3. On the other hand, if the fender is a flat fender the same result will be accomplished but the intermediate portion of the body will assume the relatively straight form defined by the flat fender as shown in Fig. 4. In either event, the flexibility of the body together with the inclined position of the stems 26 of the hook members 12 provides a construction in which the flexible body portion will be held in contact with the under face of the fender and will conform to the contour of said under face. This is an advantage because all parts of the holder will thus be fitting snugly against the fender.

We claim.

1. A splash guard for automobile fenders comprising a guard member and a holder therefor, said holder having a flexible body portion extensible in the direction of its length, and means co-operating with said holder to clamp the ends thereof to the flanges of an automobile fender with the holder on the under side of the fender in flexed conformity therewith, the extensibility of the body portion permitting the holder to be used on fenders of different widths and the flexibility of said body portion permitting it to fit fenders of different cross-sectional contours.

2. A splash guard for automobile fenders comprising a guard member and a holder therefor, said holder comprising two flexible sections of strap material connected together to slide one on the other, whereby the holder is extensible in the direction of its length and transversely flexible, and means to clamp said holder to the flanges of the automobile fender in flexed conformity to the the inner face thereof.

3. A splash guard for automobiles comprising a guard member and a holder therefor, said holder including two sections of flexible strap material connected together to slide one on the other, whereby the holder is extensible in the direction of its length and is transversely flexible, a hook-shaped clamping member secured to each end of said holder, and means to clamp said hook-shaped clamping members to the flanges of an automobile fender, each hook having a rigid stem portion having an angular relation to the legs of the hook member, the outer ends of the overlapping sections of strap material being rigidly secured to said stems whereby when the hooks are clamped to the flanges of an automobile fender the inclined position of the stems of the hooks cause the flexible sections of the holder to bow outwardly thereby to hold the guard against the under side of the fender and to cause it to conform to the shape thereof.

4. A splash guard for automobile fenders comprising a holder device including two overlapping sections of flexible strap material, each having a longitudinal slot and each having at its inner end a headed stud operating in the slot of the other section, whereby the sections are held together but can slide on each other to vary the length of the holder, a hook member secured to the outer end of each section, each hook member having a hook portion to embrace the flange of an automobile fender and a rigid stem extending at an angle from the inner leg of the hook member, said flexible sections being secured to said stems and a guard member suspended on said holder member, whereby when the hook members are clamped to the flanges of an automobile fender the nonparallel position of the inclined rigid stems of the hook members tend to bow the flexible strap material outwardly and thus hold the guard member against the under face of the fender.

5. A splash guard for automobile fenders comprising a guard member and a holder therefor, said holder comprising a flexible strap like member, means for supporting said member and attaching it to an automobile fender, said flexible strap like member extending between the supporting means in engagement with the guard member and held by said last mentioned means in flexed conformity to the inner face of the fender.

In testimony whereof, we have signed our names to this specification.

MAX ZAIGER.
LOUIS ZAIGER.